United States Patent
Qi et al.

(10) Patent No.: US 12,018,959 B2
(45) Date of Patent: Jun. 25, 2024

(54) SYSTEMS AND METHODS OF COOPERATIVE DEPTH COMPLETION WITH SENSOR DATA SHARING

(71) Applicant: TOYOTA MOTOR ENGINEERING & MANUFACTURING NORTH AMERICA, INC., Plano, TX (US)

(72) Inventors: Xuewei Qi, San Ramon, CA (US); Rui Guo, Plano, TX (US); Prashant Tiwari, Plano, TX (US); Chang-Heng Wang, Plano, TX (US); Takayuki Shimizu, Plano, TX (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 92 days.

(21) Appl. No.: 17/570,300

(22) Filed: Jan. 6, 2022

(65) Prior Publication Data
US 2023/0213354 A1    Jul. 6, 2023

(51) Int. Cl.
*G01C 21/00*    (2006.01)
*G01S 13/86*    (2006.01)
(Continued)

(52) U.S. Cl.
CPC ....... *G01C 21/3833* (2020.08); *G06F 18/251* (2023.01); *G06F 18/253* (2023.01);
(Continued)

(58) Field of Classification Search
CPC ...... G01C 21/3833; G06T 7/50; G06V 10/40; G06F 18/253; G06F 18/251
See application file for complete search history.

(56) References Cited

U.S. PATENT DOCUMENTS

| 10,324,189 B2 | 6/2019 | Luo |
| 11,010,927 B2 | 5/2021 | Lin |
| (Continued) | | |

FOREIGN PATENT DOCUMENTS

| CN | 110427504 A | 11/2019 |
| CN | 112348993 A | 2/2021 |

OTHER PUBLICATIONS

Kumar et al., LiDAR and camera fusion approach for object distance estimation in self-driving vehicles, Symmetry Dec. 2020, 324, Feb. 24, 2020, 23 pages (https://www.mdpi.com/2073-8994/12/2/324/htm).

*Primary Examiner* — Peter D Nolan
*Assistant Examiner* — Mikko Okechukwu Obioha
(74) *Attorney, Agent, or Firm* — SHEPPARD, MULLIN, RICHTER & HAMPTON LLP; Daniel N. Yannuzzi

(57) ABSTRACT

Systems and methods are provided for utilizing sensor data from sensors of different modalities and from different vehicles to generate a combined image of an environment. Sensor data, such as a point cloud, generated by a LiDAR sensor on a first vehicle may be combined with sensor data, such as image data, generated by a camera on a second vehicle. The point cloud and image data may be combined to provide benefits over either data individually and processed to provide an improved image of the environment of the first and second vehicles. Either vehicle can perform this processing when receiving the sensor data from the other vehicle. An external system can also do the processing when receiving the sensor data from both vehicles. The improved image can then be used by one or both of the vehicles to improve, for example, automated travel through or obstacle identification in the environment.

20 Claims, 8 Drawing Sheets

(51) Int. Cl.
  *G01S 13/931* (2020.01)
  *G06F 18/25* (2023.01)
  *G06T 7/50* (2017.01)
  *G06V 10/40* (2022.01)

(52) U.S. Cl.
  CPC ........... *G06T 7/50* (2017.01); *G06V 10/40* (2022.01); *G01S 13/865* (2013.01); *G01S 13/867* (2013.01); *G01S 13/931* (2013.01); *G06T 2207/10028* (2013.01); *G06T 2207/30244* (2013.01); *G06T 2207/30252* (2013.01)

(56) References Cited

U.S. PATENT DOCUMENTS

| | | | |
|---|---|---|---|
| 11,422,546 B2* | 8/2022 | Giering | G06F 18/251 |
| 11,685,403 B2* | 6/2023 | Manivasagam | G06N 3/045 |
| | | | 370/329 |
| 2019/0212746 A1* | 7/2019 | Cheng | G01K 3/14 |
| 2019/0382007 A1* | 12/2019 | Casas | G06V 20/58 |
| 2020/0233429 A1* | 7/2020 | Zhang | G05D 1/0212 |
| 2021/0209811 A1 | 7/2021 | Ramasubramonian | |
| 2021/0406560 A1* | 12/2021 | Park | G06T 7/70 |
| 2023/0109909 A1* | 4/2023 | Meng | G06F 18/253 |
| | | | 342/54 |
| 2023/0186641 A1* | 6/2023 | Vassilovski | G06T 7/20 |
| | | | 701/519 |
| 2023/0195854 A1* | 6/2023 | Ip | G01C 21/3833 |
| | | | 701/409 |

* cited by examiner

SYSTEMS AND METHODS OF COOPERATIVE DEPTH COMPLETION WITH SENSOR DATA SHARING

TECHNICAL FIELD

The present disclosure relates generally to improving systems that enable autonomous driving, and in particular, some implementations may relate to imaging systems used to capture data of environments through which vehicles navigate.

DESCRIPTION OF RELATED ART

Autonomous driving systems embedded in an autonomous vehicle can employ various imaging techniques to capture one or more images of a surrounding environment through which the autonomous vehicle is navigating. The imaging techniques may comprise image capture and image processing procedures. The image capture procedures may utilize one or more of ultrasonic sensors, radio detection and ranging (RADAR) systems, light detection and ranging (LiDAR) systems, light amplification by stimulated emission of radiation (laser) systems, camera systems, and other sensors or systems that capture data regarding the surrounding environment. The image processing procedures may process the captured data to identify features and aspects of the environment, such as boundaries of the road, objects in the environment, and the like, that the vehicle can use to navigate the environment. However, each of these imaging techniques have positive and negative attributes. For example, camera and other systems that capture images of the environment may provide dense data with less accuracy than LiDAR, RADAR, or similar systems that capture accurate but sparse (i.e., less dense) point cloud data relative to the environment. Thus, improvements to the autonomous driving systems can be realized with improvements to the imaging techniques.

BRIEF SUMMARY OF THE DISCLOSURE

In accordance with one embodiment, a method comprises generating first sensor data from a local sensor in a first vehicle of a first modality. The method further comprises receiving second sensor data from a remote sensor of a second modality in a second vehicle and applying a ML algorithm to the second sensor data and the first sensor data. The method may further comprise generating, based on application of the ML algorithm to the second sensor data and the first sensor data: a relative pose of the remote sensor relative to the local sensor and a combined depth map based on the second sensor data, the first sensor data, and the relative pose. The method may additional comprise utilizing the combined depth map to navigate an environment depicted by the combined depth map.

In some embodiments, one of the local sensor of a first modality and the remote sensor of a second modality comprises a one or more of a RADAR sensor or a LiDAR sensor and the other of the local sensor of a first modality and the remote sensor of a second modality comprises an RGB camera sensor.

In some embodiments, the second sensor data is received from the remote sensor of the second modality in the second vehicle via a wireless communication using a local radio circuit.

In some embodiments, the first sensor data comprises a raw image captured by a camera modality local sensor and the second sensor data comprises a point cloud captured by a LiDAR modality remote sensor.

In some embodiments, applying a ML algorithm to the second sensor data and the first sensor comprises: extracting a first feature vector based on the first sensor data using a first feature extractor, extracting a second feature vector based on the second sensor data using a second feature extractor, and concatenating the first feature vector with the second feature vector.

In some embodiments, generating the relative pose comprises generating a translation vector and a rotation vector corresponding to the relative pose of the remote sensor relative to the local sensor via a regression network based on the first feature vector and the second feature vector.

In some embodiments, generating the combined depth map comprises: generating a backprojected sparse depth map based on overlapping corresponding regions of the point cloud and the image according to the translation vector and the rotation vector of the relative pose between the local sensor and the remote sensor and combining the backprojected sparse depth map and a depth map generated based on the raw image using an autoencoder to generate the combined depth map.

In accordance with another embodiment, a system comprises a local sensor, a receiver circuit, a processor, and a memory. The local sensor may be of a first modality and configured to generate first sensor data. The receiver circuit may be configured to receive second sensor data from a remote sensor of a second modality. The memory may be configured to store instructions that, when executed by the processor, cause the processor to: apply a ML algorithm to the received second sensor data and the first sensor data, estimate a relative pose of the local sensor relative to the remote sensor based on application of the ML algorithm, generate a combined depth map based on the second sensor data, the first sensor data, and the relative pose, and utilize the combined depth map to navigate a region depicted by the combined depth map.

In some embodiments, one of the local sensor of a first modality and the remote sensor of a second modality comprises a one or more of a RADAR sensor or a LiDAR sensor and the other of the local sensor of a first modality and the remote sensor of a second modality comprises an RGB camera sensor.

In some embodiments, the first sensor data comprises a raw image captured by a camera modality local sensor and the second sensor data comprises a point cloud captured by a LiDAR modality remote sensor.

In some embodiments, application of the ML algorithm to the second sensor data and the first sensor comprises further instructions that, when executed by the processor, further cause the processor to: extract a first feature vector based on the first sensor data using a first feature extractor, extract a second feature vector based on the second sensor data using a second feature extractor, and concatenate the first feature vector with the second feature vector.

In some embodiments, the instructions that cause the processor to generate the relative pose comprise instructions that cause the processor to generate a translation vector and a rotation vector corresponding to the relative pose of the remote sensor relative to the local sensor via a regression network based on the first feature vector and the second feature vector.

In some embodiments, the instructions that cause the processor to generate the combined depth map comprise instructions that cause the processor to: generate a backprojected sparse depth map based on overlapping corresponding regions of the point cloud and the image according to the translation vector and the rotation vector of the relative pose between the local sensor and the remote sensor and combine the backprojected sparse depth map and a depth map generated based on the raw image using an autoencoder to generate the combined depth map.

In some embodiments, a cloud-based system comprises a receiver circuit configured to receive: first sensor data from a first remote sensor of a first modality at a first vehicle and second sensor data from a second remote sensor of a second modality at a second vehicle. In some embodiments, cloud-based system further comprises a processor and a memory configured to store instructions that, when executed by the processor, cause the processor to: apply a ML algorithm to the first sensor data and the second sensor data, estimate a relative pose of the first sensor relative to the second sensor based on application of the ML algorithm, and generate a combined depth map based on the first sensor data, the second sensor data, and the relative pose. The cloud-based system may further comprise a transmitter circuit configured to transmit the combined depth map to at least one of the first vehicle or the second vehicle to enable the at least one of the first vehicle or the second vehicle to navigate an environment depicted by the combined depth map.

In some embodiments, one of the first sensor of a first modality and the second sensor of a second modality comprises a one or more of a RADAR sensor or a LiDAR sensor and the other of the first sensor of a first modality and the second sensor of a second modality comprises an RGB camera sensor.

In some embodiments, the first sensor data comprises a raw image captured by a camera modality first sensor and the second sensor data comprises a point cloud captured by a LiDAR modality second sensor.

In some embodiments, application of the ML algorithm to the second sensor data and the first sensor data comprises further instructions that, when executed by the processor, further cause the processor to: extract a first feature vector based on the first sensor data using a first feature extractor, extract a second feature vector based on the second sensor data using a second feature extractor, and concatenate the first feature vector with the second feature vector.

In some embodiments, the instructions that cause the processor to generate the relative pose comprise instructions that cause the processor to generate a translation vector and a rotation vector corresponding to the relative pose of the first sensor relative to the second sensor via a regression network based on concatenation of the first feature vector with the second feature vector.

In some embodiments, the instructions that cause the processor to generate the combined depth map comprise instructions that cause the processor to: generate a backprojected sparse depth map based on overlapping corresponding regions of the point cloud and the image according to the translation vector and the rotation vector of the relative pose between the first sensor and the second sensor and combine the backprojected sparse depth map and a depth map generated based on the raw image using an autoencoder to generate the combined depth map.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
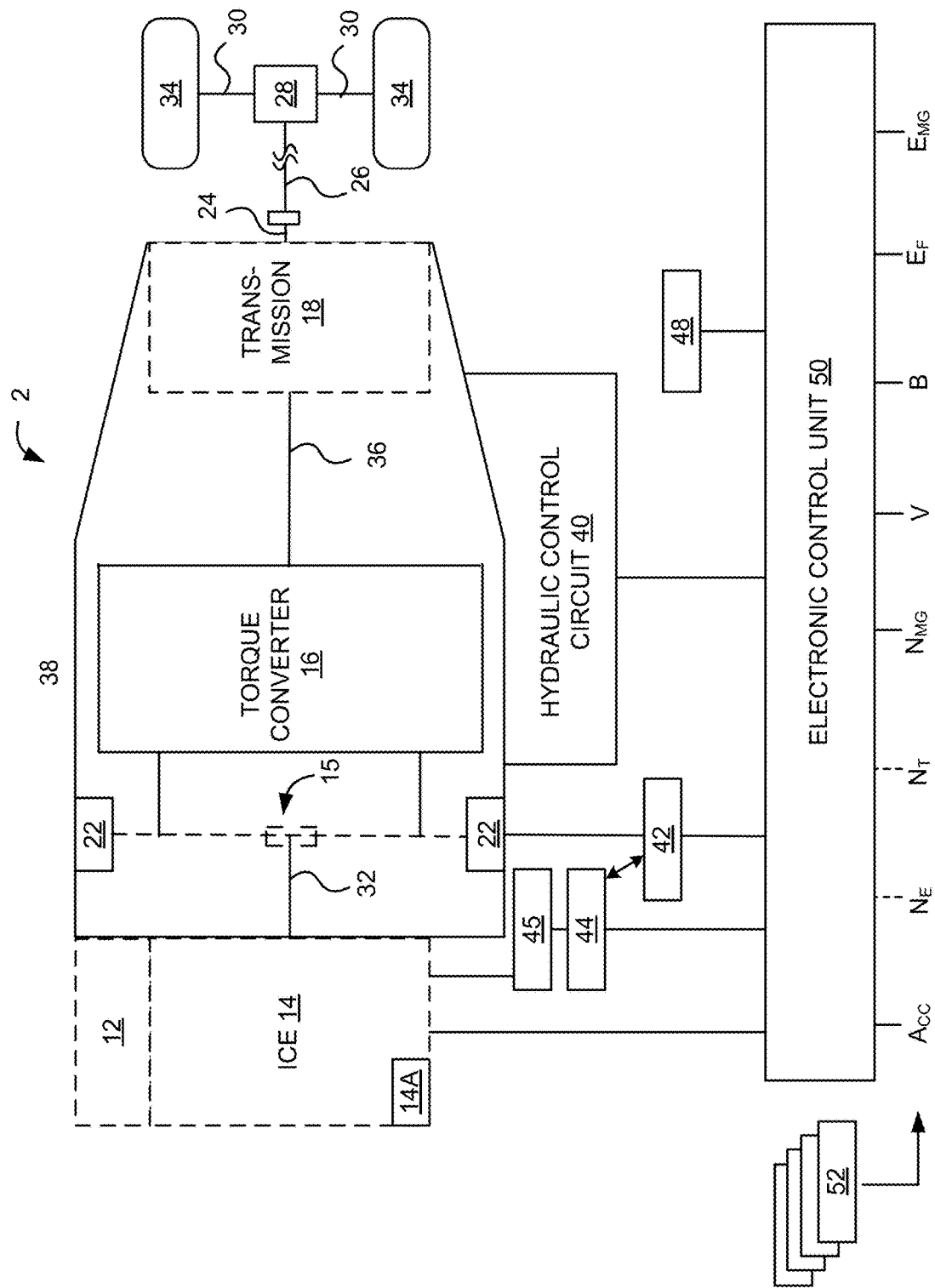
FIG. 1 is a schematic representation of an example hybrid vehicle with which embodiments of the systems and methods disclosed herein may be implemented.

The figures are not exhaustive and do not limit the present disclosure to the precise form disclosed.

DETAILED DESCRIPTION

Embodiments of the systems and methods disclosed herein can provide a solution for generating accurate depth information for an environment. Specifically, the systems and methods disclosed herein may provide a novel and non-obvious solution for generating accurate and detailed environmental depth maps. Embodiments fuse sensor data from a first modality sensor, such as a camera sensor, onboard a first vehicle with sensor data from a second modality sensor, such as a LiDAR sensor, onboard a second vehicle, where the sensor data is shared between the vehicles via vehicle-to-vehicle (V2V) wireless communications. The second vehicle may be in close proximity to the first vehicle but at a location relative to the first vehicle where a perspective of the second vehicle adds detail that is not available to the first vehicle, and vice versa. The first vehicle can process the fused sensor data to generate environmental depth information, such as a depth map, that is more detailed than environmental depth information generated based on only the camera sensor data or only the LiDAR sensor data.

In some embodiments, the imaging systems collect data from one single sensor (for example, a LiDAR or camera sensor) or multiple sensors (for example, a LiDAR and a camera sensor) onboard a single vehicle. As such, the image processing systems may generate depth information, such as a depth map, based on the data collected by the one or more sensors of the single vehicle. However, the generated depth map may have a limited field of view (FOV) based on the location and perspective of the single vehicle, which may reduce the accuracy and density of the image data and resulting depth map generated at the single vehicle. In embodiments where sensor data from a first LiDAR on a first vehicle is shared with sensor data from a second LiDAR on a second vehicle, the fused depth map may lack detail provided by images generated from cameras or other sensor modalities. Furthermore, when the single vehicle only collects data from a single modality sensor, the depth map itself may be generated based on less complete data than depth maps generated based on data from multiple modalities of sensors.

Each of these example systems do not and cannot leverage sensor data of different modalities and from nearby vehicles to improve data capture and field of view (FOV) for the single vehicle when generating depth maps or 3D reconstructions of the environment. Thus, the single vehicle cannot generate the same accurate and dense depth map as the fused camera data captured by one or more onboard sensors of different modalities on first and second vehicles navigating a road.

Based on the depth map generated from point cloud data captured by a first modality sensor disposed on a first vehicle and image data captured by a second modality sensor disposed on a second vehicle, the systems and methods disclosed herein may be configured to estimate a dynamic relative pose of each of the first and the second modality sensors from first and second vehicles in proximity of each other. The estimated relative poses may be further leveraged to generate accurate depth maps based on the sensor data and stitching or fusing the FOV from both sensors of the first vehicle and the second vehicle together. An entire pipeline of processing the individual sensor data to fusing the processed sensor data can be implemented in one single deep neural network and trained in an end-to-end manner. Further detail regarding implementing the disclosed technology is provided below.

The systems and methods disclosed herein may be implemented with any of a number of different vehicles and vehicle types. For example, the systems and methods disclosed herein are used with automobiles, trucks, motorcycles, recreational vehicles, and other like on-or off-road vehicles. In addition, the principals disclosed herein may also extend to other vehicle types as well. An example hybrid electric vehicle (HEV) in which embodiments of the disclosed technology may be implemented is illustrated in FIG. 1. Although the example described with reference to FIG. 1 is a hybrid type of vehicle, the systems and methods for cooperative depth completion with sensor data sharing described herein can be implemented in other types of vehicles, including gasoline- or diesel-powered vehicles, fuel-cell vehicles, electric vehicles, or other vehicles.

FIG. 1 illustrates a drive system of a vehicle 2 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

As an HEV, vehicle 2 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be an HEV travel mode that uses engine 14 and the motor(s) 22 as the sources of motive power. In the engine-only and HEV travel modes, vehicle 2 relies on the motive force generated at least by internal combustion engine 14, and a clutch 15 may be included to engage engine 14. In the EV travel mode, vehicle 2 may be powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from the engine 14. For example, the cooling system 12 can be implemented to include a radiator, a water pump, and a series of cooling channels (not shown in FIG. 1). In operation, the water pump circulates coolant through the engine 14 to absorb excess heat from the engine. The heated coolant is circulated through the radiator to remove heat from the coolant, and the cold coolant can then be recirculated through the engine. A fan (not shown in FIG. 1) may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of the engine 14. The output control circuit 14A may include a throttle actuator to control an electronic throttle valve that controls fuel injection, an ignition device that controls ignition timing, and the like. The output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power to and adjust vehicle speed of vehicle 2 and is powered electrically via a battery 44. The motor 22 may be connected to the battery 44 via an inverter 42. Battery 44 may be implemented as one or more power storage devices including, for example, batteries, capacitive storage devices, and so on. When the battery 44 is implemented using one or more batteries, the batteries can include, for example, nickel metal hydride batteries, lithium ion batteries, lead acid batteries, nickel cadmium batteries, lithium ion polymer batteries, and other types of batteries. The battery 44 may also be used to power electrical or electronic systems in the vehicle 2 besides the motor 22. The battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch or switch (not shown) can be included to engage/disengage the battery charger 45. The battery 44 may also be charged by motor 22 such as, for example, by regenerative braking or by coasting during which time motor 22 operates as generator.

An electronic control unit 50 (described below) may be included and may control the electric drive components of the vehicle 2 as well as other vehicle components. For example, the electronic control unit 50 may control the inverter 42, adjust driving current supplied to motor 22, and adjust the current received from motor 22 during regenerative coasting and breaking. As a more particular example, output torque of the motor 22 can be increased or decreased by the electronic control unit 50 through the inverter 42.

The torque converter 16 can control the application of power from the engine 14 and motor 22 to the transmission 18. The torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle 2. In the illustrated example, a crankshaft 32, which is an output member of the engine 14, may be selectively coupled to motor 22 and the torque converter 16 via the clutch 15. The clutch 15 can be implemented as, for example, a multiple disc type hydraulic frictional engagement device whose engagement is controlled by an actuator such as a hydraulic actuator. The clutch 15 may be controlled such that its engagement state is complete engagement, slip engagement, and complete disengagement, depending on the pressure applied to the clutch. For example, a torque capacity of the clutch 15 is controlled according to the hydraulic pressure supplied from a hydraulic control circuit (not illustrated). When the clutch 15 is engaged, power transmission is provided in the power transmission path between the crankshaft 32 and torque converter 16. On the other hand, when the clutch 15 is disengaged, motive power from the engine 14 is not delivered to the torque converter 16. In a slip engagement state, the clutch 15 is engaged, and motive power is provided to the torque converter 16 according to a torque capacity (transmission torque) of the clutch 15.

As alluded to above, vehicle 2 may include the electronic control unit 50. The electronic control unit 50 may include circuitry to control various aspects of the vehicle 2 operation. The electronic control unit 50 includes, for example, a microcomputer that includes a one or more processing units (e.g., microprocessors), memory storage (e.g., RAM, ROM, etc.), and I/O devices. The processing units of the electronic control unit 50 execute instructions stored in the memory storage to control one or more electrical systems or subsystems in the vehicle 2. The electronic control unit 50 can include a plurality of electronic control units such as an electronic engine control module, a powertrain control module, a transmission control module, a suspension control module, a body control module, and so on. As a further example, the electronic control unit 50 can control systems and functions such as doors and door locking, lighting, human-machine interfaces, cruise control, telematics, braking systems (e.g., ABS or ESC), battery management systems, and so on. These various control units can be implemented using two or more separate electronic control units or using a single electronic control unit.

In the example illustrated in FIG. 1, the electronic control unit 50 receives information from a plurality of sensors included in the vehicle 2. For example, the electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of the engine 14 (for example, engine RPM), a rotational speed, $N_{MG}$, of the motor 22 (motor rotational speed), and vehicle speed, $N_V$. These may also include torque converter 16 output, $N_T$ (e.g., output amps indicative of motor output), brake operation amount/pressure, B, battery SOC (i.e., the charged amount for battery 44 detected by an SOC sensor). Accordingly, the vehicle 2 can include a plurality of sensors 52 that can be used to detect various conditions internal or external to the vehicle and provide sensed conditions to the electronic control unit 50 (which, again, may be implemented as one or a plurality of individual control circuits). In one embodiment, the sensors 52 may be included to detect one or more conditions directly or indirectly such as, for example, fuel efficiency, $E_F$, motor efficiency, $E_{MG}$, hybrid (engine 14+motor 12) efficiency, acceleration, $A_{CC}$, etc.

In some embodiments, one or more of the sensors 52 may include their own processing capability to compute the results for additional information that can be provided to the electronic control unit 50. In other embodiments, one or more of the sensors 52 may be data-gathering-only sensors that provide only raw data to the electronic control unit 50. In further embodiments, the one or more sensors 52 may include hybrid sensors that provide a combination of raw data and processed data to the electronic control unit 50. The one or more sensors 52 may provide an analog output or a digital output.

The sensors 52 may detect not only vehicle conditions but also external conditions of the vehicle 2 as well. For example, sonar, radar, LiDAR, or other vehicle proximity sensors, and cameras or other image sensors can detect external conditions of the vehicle 2. These sensors can be used to detect, for example, traffic signs indicating a current speed limit, road curvature, obstacles, neighboring vehicles, and so on. Still other sensors may include those that can detect road grade. While some sensors can be used to actively detect passive environmental objects, other sensors can be included and used to detect active objects such as those objects used to implement smart roadways that may actively transmit and/or receive data or other information. The electronic control unit 50 may receive data captured from the camera sensor and/or the LiDAR sensor and convey the received data to an image processing component and/or an autonomous driving component (not shown). In some embodiments, the sensors 52 or the electronic control unit 50 may include a vehicle-to-vehicle (V2V) or vehicle-to-other (V2X) communication interface that enables the vehicle 2 to communicate wirelessly with neighboring vehicles or other electronic devices. Further details regarding some of the components of the vehicle 2 are provided below with reference to FIG. 2.

Figure 2:
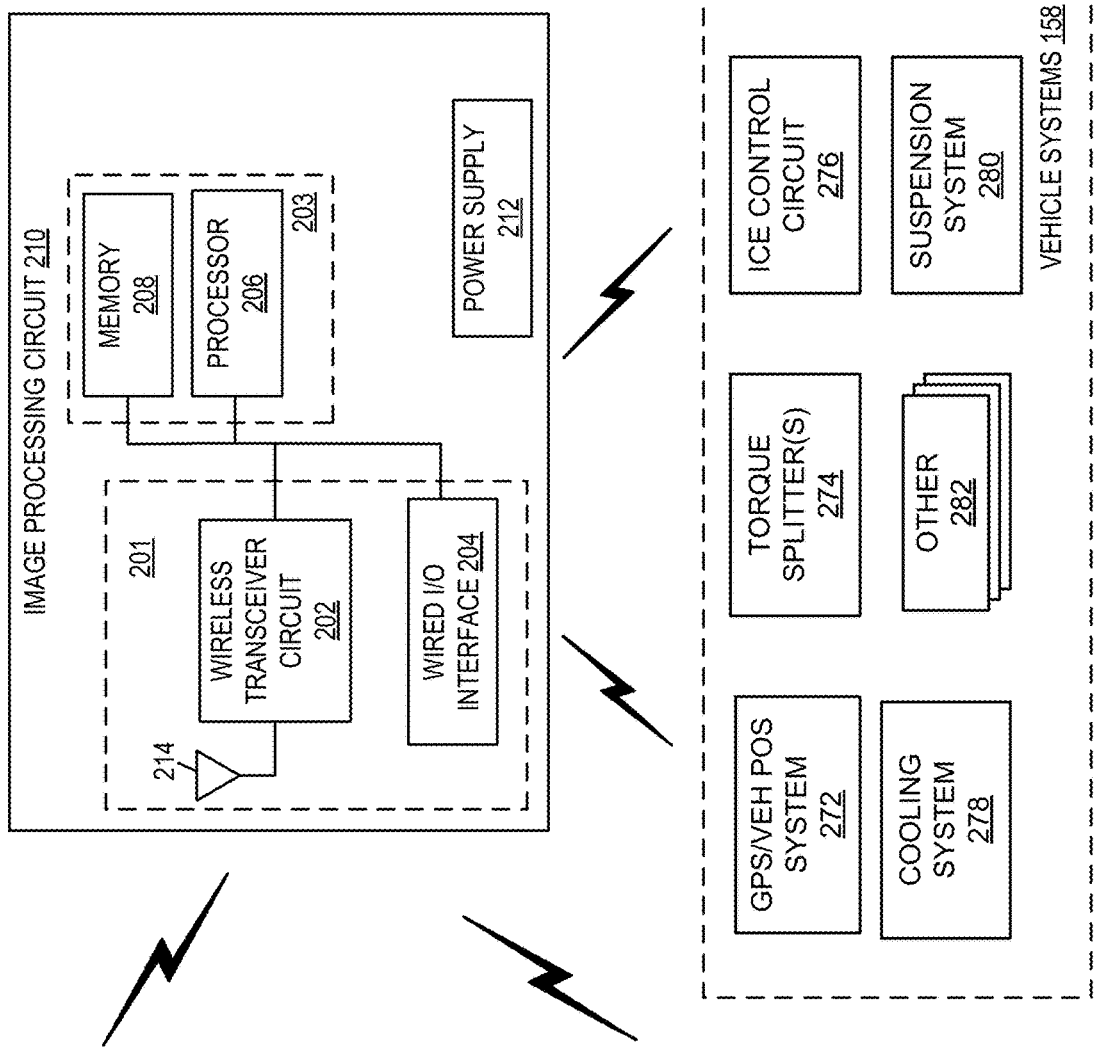
FIG. 2 illustrates an example architecture for capturing and processing images of an environment of a vehicle, in accordance with one embodiment of the systems and methods described herein.
Figure 2:
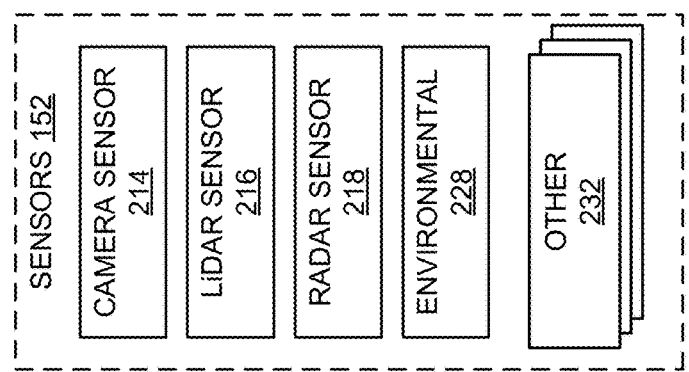

FIG. 2 illustrates an example system 200 for capturing and processing data of the environment of the vehicle 2 of FIG. 1, in accordance with one embodiment of the systems and methods described herein. The system 200 includes an image processing circuit 210, a plurality of sensors 152 (which may correspond to the sensors 52), and a plurality of vehicle systems 158. The sensors 152 and the vehicle systems 158 can communicate with the image processing circuit 210 via a wired or wireless communication interface. Although the sensors 152 and vehicle systems 158 are depicted as communicating with the imaging circuit 210, they can also communicate with each other as well as with other vehicle systems or other vehicles. In some embodiments, the image processing circuit 210 is implemented as an ECU or as part of an ECU such as, for example, the electronic control unit 50. In other embodiments, the image processing circuit 210 is implemented independently of the ECU.

The image processing circuit 210 in this example includes a communication circuit 201, a processing circuit 203 comprising a processor 206 and memory 208, and a power supply 212. Components of the image processing circuit 210 are illustrated as communicating with each other via a data bus, although other communication interfaces, wired or wireless, can be included.

The processor 206 can include a GPU, CPU, microprocessor, or any other suitable processing system. The memory 208 may include one or more various forms of memory or data storage (e.g., flash, RAM, etc.) that may be used to store one or more of calibration parameters, machine learning algorithms, images (captured or training), point clouds, instructions, and variables for the processor 206 as well as any other suitable information. The memory 208 can be made up of one or more modules of one or more different types of memory and may be configured to store data and other information as well as operational instructions that may be used by the processor 206 to utilize the image processing circuit 210.

Although the example of FIG. 2 is illustrated using the processing circuit 203, as described below with reference to circuits disclosed herein, the processing circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up the image processing circuit 210.

The communication circuit 201 comprises either or both a wireless transceiver circuit 202 with an associated antenna 214 and a wired I/O interface 204 with an associated hardwired data port (not illustrated). The wireless transceiver circuit 202 can include a transmitter and a receiver (not shown) to allow wireless communications via any of a number of communication protocols such as, for example, Wi-Fi, Bluetooth, millimeter wave (mmWave), near field communications (NFC), Zigbee, and any of a number of other wireless communication protocols whether standardized, proprietary, open, point-to-point, networked or otherwise. The antenna 214 is coupled to the wireless transceiver circuit 202 and is used by the wireless transceiver circuit 202 to transmit and/or receive radio signals wirelessly to and/or from wireless equipment with which it is connected. These radio signals can include various information that is sent or received by the image processing circuit to/from other entities, such as the sensors 152 and the vehicle systems 158. In some embodiments, the wireless transceiver circuit 202 is used to communicate information for other aspects of the vehicle 2.

The wired I/O interface 204 can include a transmitter and a receiver (not shown) for hardwired communications with other devices. For example, the wired I/O interface 204 can provide a hardwired interface to other components, including the sensors 152 and vehicle systems 158. The wired I/O interface 204 can communicate with other devices using Ethernet, controller area network (CAN), or any of a number of other wired communication protocols whether standardized, proprietary, open, point-to-point, networked or otherwise.

The power supply 212 can include one or more of a battery or batteries (such as, e.g., Li-ion, Li-Polymer, NiMH, NiCd, NiZn, and NiH$_2$, to name a few, whether rechargeable or primary batteries,), a power connector (e.g., to connect to vehicle supplied power, etc.), an energy harvester (e.g., solar cells, piezoelectric system, etc.), or it can include any other suitable power supply. In some embodiments, the power supply 212 corresponds to or receives power from the battery 44 of the vehicle 2.

The sensors 152 can include additional sensors that may or may not otherwise be included on the vehicle 2 in which the image processing system 200 is implemented. In the illustrated example, the sensors 152 include one or more of a camera sensor 214, a LiDAR sensor 216, a radar sensor 218, and environmental sensors 228. In some embodiments, the camera sensor 214 generates or captures images of the environment of the vehicle 2 in one or more directions relative to the vehicle 2. The camera sensor 214 can comprise an RGB or similar sensor. The LiDAR sensor 216 may comprise transmitter and receiver components. The transmitter may emit light waves in one or more directions. These emitted light waves may reflect off of objects in the environment. The receiver may detect the reflected waves, which then may be analyzed (for example, by the processing circuit 203) to identify the location, speed, depth, and direction of the objects. In some embodiments, the reflected waves are analyzed as points in a 3D space representing the environment or objects therein. The radar sensor 218 may also comprise transmitter and receiver components and operate similar to the LiDAR sensor 216 but using radio waves instead of light waves. The environmental sensors 228 may comprise other sensors that detect one or more features of the environment, such as light detection, rain detection, frost detection, and similar sensors. Additional sensors 232 can also be included as may be appropriate for a given implementation of the image processing circuit 210.

The vehicle systems 158 can include any of a number of different vehicle components or subsystems used to control or monitor various aspects of the vehicle 2 and its performance. In this example, the vehicle systems 158 include a GPS or other vehicle positioning system 272; torque splitters 274 can control distribution of power among the vehicle wheels such as, for example, by controlling front/rear and left/right torque split; engine control circuits 276 to control the operation of engine (e.g. Internal combustion engine 14); cooling systems 278 to provide cooling for the motors, power electronics, the engine, or other vehicle systems; suspension system 280 such as, for example, an adjustable-height air suspension system, and other vehicle systems.

During operation, the image processing circuit 210 can receive and process information from various vehicle sensors of the sensors 152 to generate depth maps and similar information regarding the environment and location of objects therein, which can help navigate the vehicle through the environment. The communication circuit 201 can be used to transmit and receive information between the sensors 152 of the vehicle 2 or another vehicle, between the vehicle 2 and a cloud-based computing system, and so forth.

Figure 3:
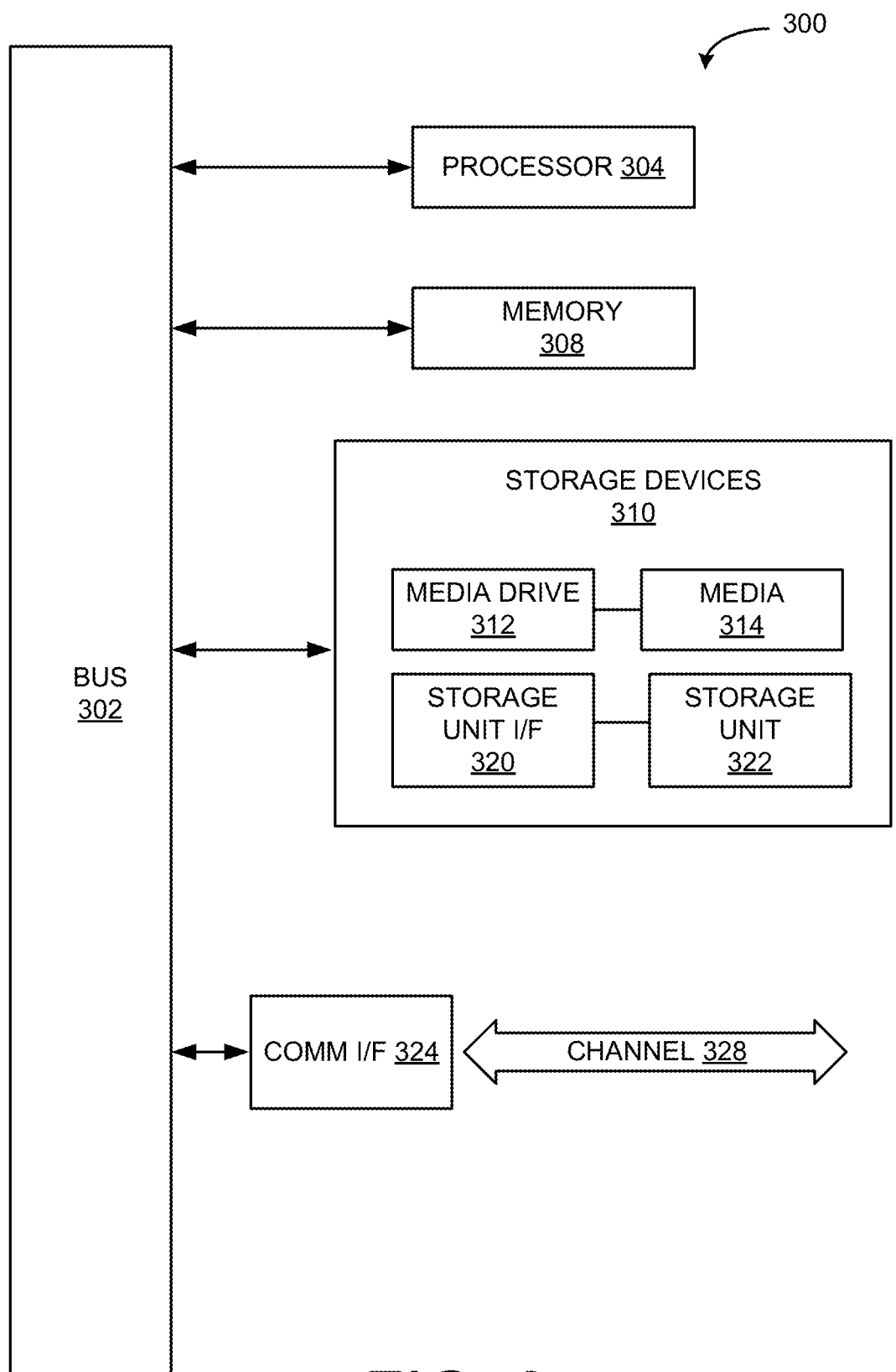
FIG. 3 is an example computing component that may be used to implement various features of embodiments described in the present disclosure.

As used herein, the terms circuit and component used herein, for example, with respect to FIG. 2 might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 3. Various embodiments are described in terms of this example-computing component 300. After reading this description, it will become apparent to a person skilled in the relevant art how to implement the application using other computing components or architectures.

Referring now to FIG. 3, computing component 300 may represent, for example, computing or processing capabilities found within the vehicle 2, for example, in a self-adjusting display, desktop, laptop, notebook computers, tablet computers, and the electronic control unit 50. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 300 might also represent computing capabilities embedded within or otherwise available to a given device. For example, a computing component might be found in other electronic devices, such as, for example, portable computing devices, and other electronic devices that might include some form of processing capability.

The computing component 300 might include, for example, one or more processors, controllers, control components, or other processing devices. This can include a processor 304, which corresponds to the processor 206 of FIG. 2. The processor 304 might be implemented using a general-purpose or special-purpose processing engine, as described above with respect to the processor 206. The processor 304 may be connected to a bus 302. However, any communication medium can be used to facilitate interaction with other components of computing component 300 or to communicate externally.

The computing component 300 might also include one or more memory components, simply referred to herein as main memory 308. For example, random access memory (RAM) or other dynamic memory, might be used for storing information and instructions to be executed by processor 304, similar to the memory 208. The main memory 308 might also be used for storing temporary variables or other intermediate information during execution of instructions to be executed by the processor 304. The computing component 300 might likewise include a read only memory ("ROM") or other static storage device coupled to the bus 302 for storing static information and instructions for the processor 304.

The computing component 300 might also include one or more various forms of information storage mechanism 310, which might include, for example, a media drive 312 and a storage unit interface 320. The media drive 312 might include a drive or other mechanism to support fixed or removable storage media 314. For example, a hard disk drive, a solid-state drive, a magnetic tape drive, an optical drive, a compact disc (CD) or digital video disc (DVD) drive (R or RW), or other removable or fixed media drive might be provided. The storage media 314 might include, for example, a hard disk, an integrated circuit assembly, magnetic tape, cartridge, optical disk, a CD or DVD. The storage media 314 may be any other fixed or removable medium that is read by, written to, or accessed by the media drive 312. As these examples illustrate, the storage media 314 can include a computer usable storage medium having stored therein computer software or data.

In alternative embodiments, information storage mechanism 310 might include other similar instrumentalities for allowing computer programs or other instructions or data to be loaded into computing component 300. Such instrumentalities might include, for example, a fixed or removable storage unit 322 and an interface 320. Examples of such storage units 322 and interfaces 320 can include a program cartridge and cartridge interface, a removable memory (for example, a flash memory or other removable memory component) and memory slot. Other examples may include a PCMCIA slot and card, and other fixed or removable storage units 322 and interfaces 320 that allow software and data to be transferred from storage unit 322 to the computing component 300.

The computing component 300 might also include a communications interface 324. Communications interface 324 might be used to allow software and data to be transferred between computing component 300 and external devices. Examples of communications interface 324 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 324 may be carried on signals, which can be electronic, electromagnetic (which includes optical) or other signals capable of being exchanged by a given communications interface 324. These signals might be provided to communications interface 324 via a channel 328. Channel 328 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 308, storage unit 320, media 314, and channel 328. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 300 to perform features or functions of the present application as discussed herein.

Figure 4:
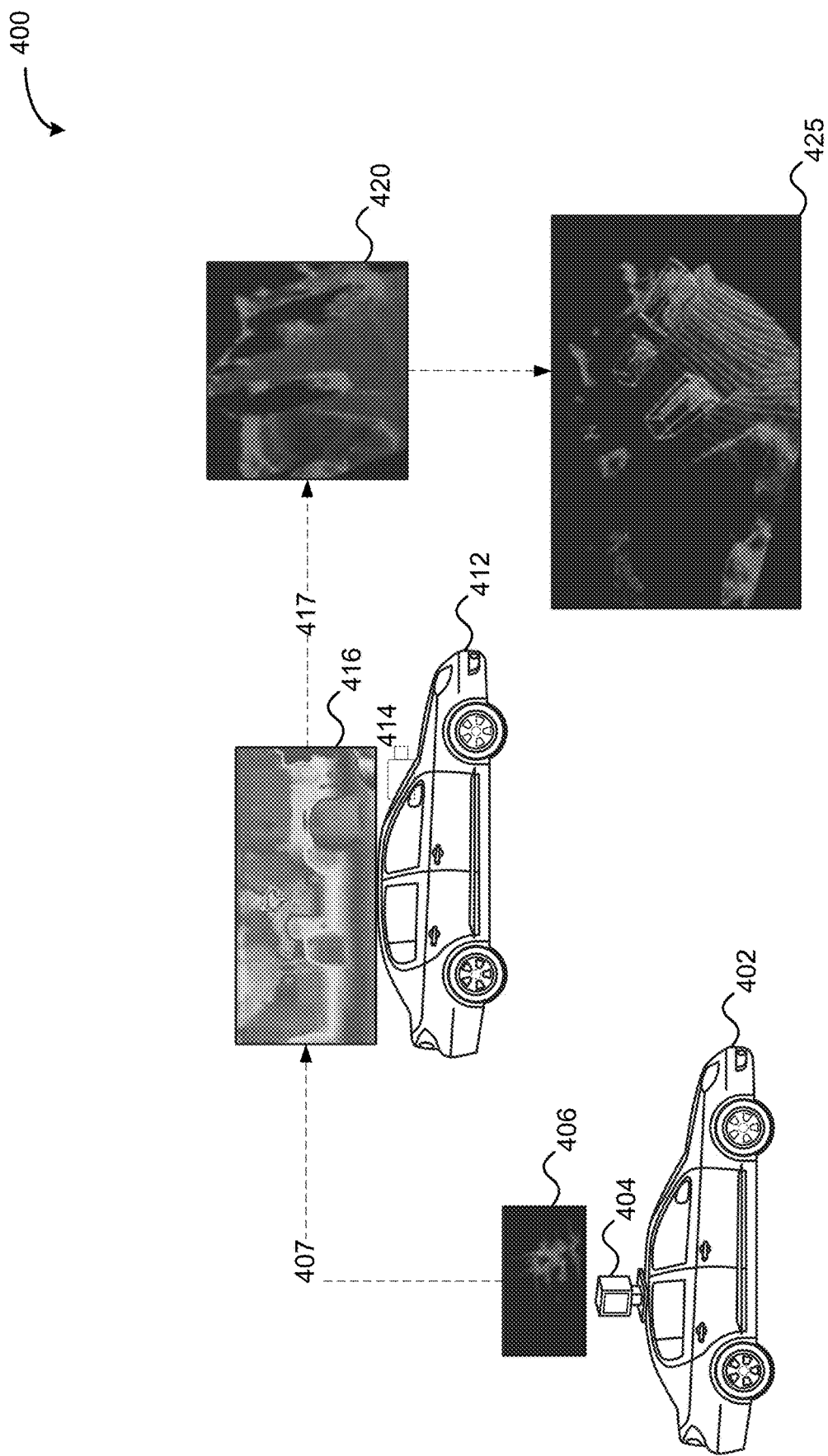
FIG. 4 depicts a high-level flow diagram of an example system of vehicles configured to perform cooperative depth completion based on sensor data from different modality image sensors from different vehicles in accordance with various embodiments.

FIG. 4 depicts a high-level flow diagram 400 of an example system configured to perform cooperative depth completion based on sensor data from different modality image sensors from different vehicles in accordance with various embodiments. The diagram 400 includes a first vehicle 402 having a first modality sensor 404, such as a LiDAR sensor, that generates a point cloud 406 of an environment of the first vehicle 402 from a perspective or point of view (POV) of the first vehicle 402. The diagram 400 further includes a second vehicle 412 having a second modality sensor 414, such as an RGB camera sensor, that generates an image 416 of the environment from a POV of the second vehicle 412. In some embodiments, the first modality sensor 404 and the second modality sensor 414 have different poses relative to each other.

The first and second vehicles 402, 412 may share data, such as the point cloud 406, the image 416, or data generated therefrom. In the diagram 400, the first vehicle 402 shares the point cloud 406 (or a portion thereof) with the second vehicle 412 via communication 407. The communication 407 between the first vehicle 402 and the second vehicle 412 may occur via a V2V or similar communication protocol, such as mmWave communications, infrared (IR) communications, Bluetooth communications, or other wireless communications. The second vehicle 412 may use the shared point cloud 406 in combination with the image 416 generated by the second modality sensor 414 in an end-to-end cooperative depth completion pipeline for fusing the shared point cloud 406 and the image 416 as described herein.

In some embodiments, where the point cloud 406 comprises data of the entire 3D environment of the first vehicle 402, the first vehicle 402 may share only a portion of the point cloud 406 that is relevant to the second vehicle 412. The second vehicle 412, being the recipient of the point cloud 406 from the first vehicle 402, may fuse the received point cloud 406 with the image 416 at 417 to generate a complete dense point cloud 420. Because the complete dense point cloud 420 includes the data from both the point cloud 406 as well as the data from the image 416, the complete dense point cloud 420 has a wider FOV and range than either of the point cloud 406 or the image 416 individually. This complete dense point cloud 420 can then be used at 425 by the second vehicle 412 to perform various operations, such as perception, localization, and mapping of objects, etc., in the environment of the second vehicle 412. In some embodiments, the second vehicle 412 can share one or more of the complete dense point cloud 420 or results of the various operations with neighboring vehicles, such as the first vehicle 402, or with a centralized server (not shown) for use by other vehicles.

By combining the point data from the point cloud 406 with the data from the image 416, the second vehicle 412 is able to overcome the disadvantages of using the data generated by only one of the first sensor 404 and the second sensor 414 while maintaining the respective benefits of both sensors. For example, point clouds are viewed generally as having more accurate data than camera images, while camera images generally have denser data than point clouds. By fusing the point cloud 406 with the image 416, the accurate data of the point cloud 406 is maintained and used to supplement the lesser accurate image data while the dense data of the image 416 supplements the sparser data of the point cloud 406. Thus, fusing data from the different sensor modalities enables cooperative depth completion, whereby the point cloud 406 and the image 416 are used cooperatively to provide more complete depth data than either the point cloud 406 or the image 416 alone. This complete depth data, which may comprise a depth map or the complete dense point cloud, may be more reliable and detailed than depth maps and other depth information generated based on either single sensor modality.

Furthermore, fusing the sensor data obtained by different vehicles may base the complete dense point cloud 420 on different perspectives and poses, which generally may not be available from multiple sensors on a single vehicle. For example, the first vehicle 402 with the sensor 404, generally, may be at least 5-10 feet away from the second vehicle 412 with the sensor 414 and may be as far as dozens or hundreds of feet away from the second vehicle 412. This distance between the first and second vehicles 402, 412 may provide different perspectives between the respective sensors 404, 414 on the respective vehicles 402, 412. Where the distance and poses between the sensors 404, 414 are greater, fusing corresponding data may provide additional detail that would not be available from either the point cloud 406 or the image 416. This additional data may be helpful or useful for processing to enable one or more autonomous driving operations.

Figure 5:
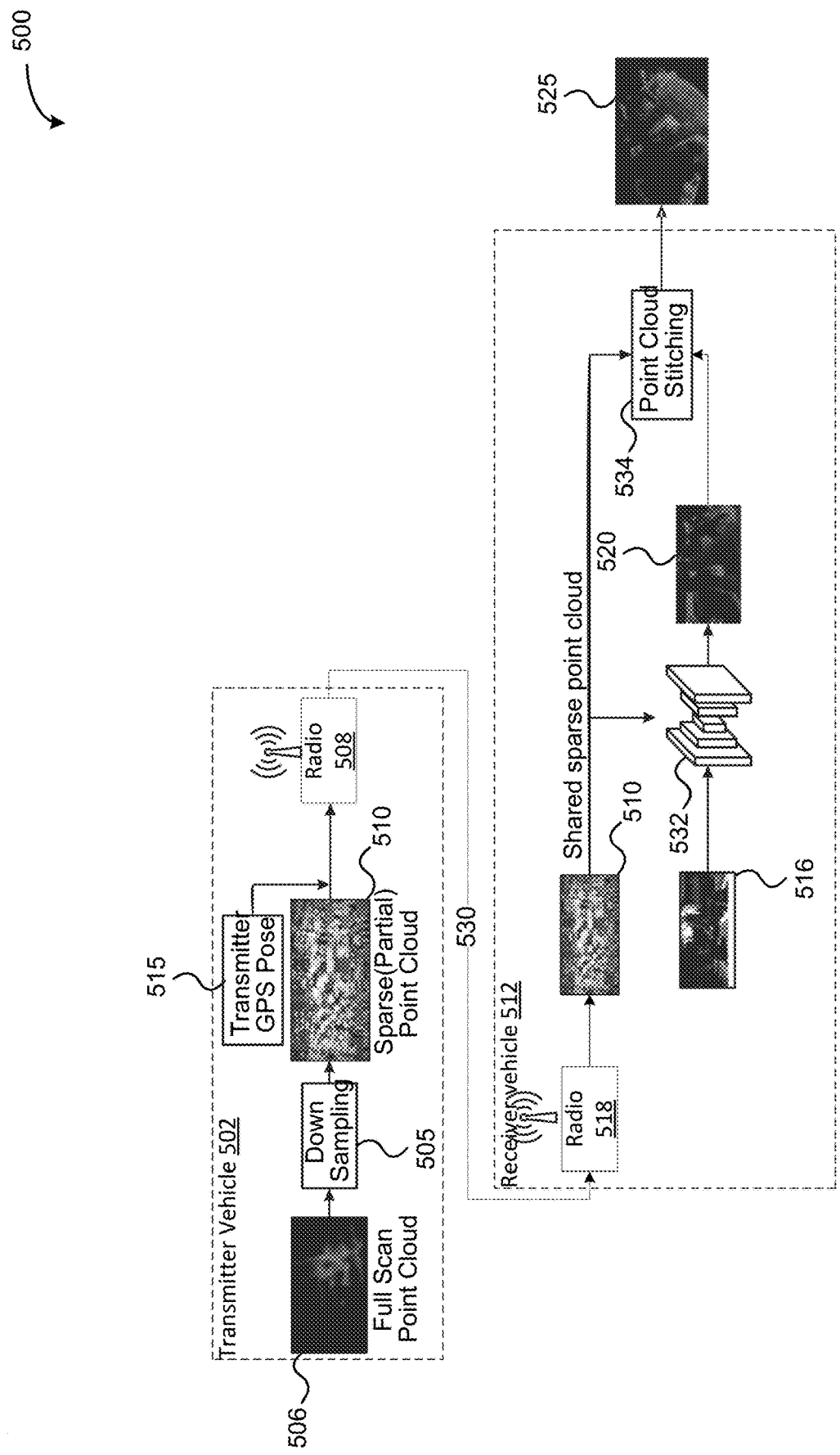
FIG. 5 depicts a flow diagram providing additional details regarding the capture and sharing of data between vehicles of an example system performing the cooperative depth completion in accordance with various embodiments.

In view of the above, the complete dense point cloud 420 generated based on the end-to-end cooperative depth completion pipeline described herein may provide various benefits, as introduced above, over single sensor depth maps, depth maps generated based on single modality sensor data from different vehicles, and depth maps generated based on multimodality sensor data from a single vehicle. FIG. 5 provides further detail regarding the capture, exchange, and processing of sensor data described in FIG. 4.

FIG. 5 depicts a flow diagram 500 providing additional details regarding the capture and sharing of data between vehicles of an example system the cooperative depth completion in accordance with various embodiments. More specifically, the diagram 500 provides a more detailed representation of an example of data capture and sharing by a transmitter vehicle 502 (for example, corresponding to the first vehicle 402) and data receipt, capture, and processing by a receiver vehicle 512 (for example, corresponding to the second vehicle 412).

The transmitter vehicle 502 may capture a (raw) point cloud 506 using a LiDAR, or similar, sensor (such as the LiDAR sensor 404). The point cloud 506 may comprise a set of data points in a 3D space representing the 3D environment around the transmitter vehicle 502. As introduced, the points in the point cloud 506 may represent points on surfaces of objects in a FOV of the LiDAR sensor that reflect a signal emitted by the LiDAR sensor.

The point cloud 506 may have a density based on how many points the point cloud 506 contains in a given region of space. For example, a low density point cloud includes a low number of points that definitively identify boundaries of the receiver vehicle 512 (such as a roof line, front and rear bumpers, and the like) but not much more. On the other hand, a high density point cloud may include sufficient points to identify definitively particular features of the receiver vehicle 512 (such as mirrors, handles, windows, lights, and so forth) along with the boundaries of the receiver vehicle 512. However, capturing a high density point cloud may require more expensive LiDAR sensors and more processing time as compared to low density point cloud. Thus, given the cost and processing constraints associated with vehicle sensors, the LiDAR sensor of the transmitter vehicle 502 (or the receiver vehicle 512) may generally generate the point cloud 506 having a limited density.

In some embodiments, the point cloud 506 includes extraneous data, such as duplicate points, and so forth. The transmitter vehicle 502 may downsample the point cloud 506 at block 505 to obtain a sparse, or partial, point cloud 510 having fewer data points than the point cloud 506. Downsampling the point cloud 506 may comprise applying one or more downsampling techniques to reduce information redundancy, error, and so forth, in the point cloud 506, thereby improving (for example, reducing) bandwidth, storage, and processing requirements associated with the sparse point cloud 510 as compared to the point cloud 506.

The transmitter vehicle 502 may transmit the sparse point cloud 510 to the receiver vehicle 512 in combination with a transmitter GPS or other pose data 515. The pose data 515 may correspond to a pose of the LiDAR sensor, such as the LiDAR sensor 216, and/or the transmitter vehicle 502 that generates the sparse point cloud 510. The transmitter vehicle 502 may transmit the combination of the pose data 515 and the sparse point cloud 510 to the receiver vehicle 512 using a radio 508. As introduced above, the radio 508 may comprise a mmWave radio, a Bluetooth radio, a Wi-Fi radio, and so forth, to communicate wirelessly with the receiver vehicle 512 using a wireless communication 530.

The receiver vehicle 512 may receive the sparse point cloud 510 from the transmitter vehicle 502 communication 530 with a radio 518, having similar functionality and capability as the radio 508. The receiver vehicle 512 may employ a camera sensor (corresponding to the camera sensor 414) to generate an image 516 (corresponding to the image 416). The camera sensor may capture the environment of the receiver vehicle 512 and generate the image 516 to include representations of objects in a FOV of the camera sensor. The image 516 may include a very dense representation of objects in the environment but have low accuracy because the image 516 captures all objects in the environment with high detail but the image 516 may lose depth between objects in the environment. Capturing higher accuracy images may require more expensive camera sensors 414 and more processing time as compared to lower accuracy images. Thus, given the cost and time constraints associated with vehicle sensors, the sensor 414 may generate the image 416 having a limited accuracy.

The receiver vehicle 512 may combine the sparse point cloud 510 with the image 516 using a depth correction network 532. The depth correction network 532 may perform, at least in part, the data processing and fusing of data for the end-to-end cooperative depth completion pipeline introduced above. More specifically, the depth correction network 532 fuses the sparse point cloud 510 with the image 516 to generate a corrected dense point cloud 520 that is more detailed and more accurate than each of the sparse point cloud 510 and the image 514 individually. Details of operation of the depth correction network 532 are provided below with reference to FIG. 6.

The receiver vehicle 512 stitches the corrected dense point cloud 520 together with the sparse point cloud 510 to generate a stitched and corrected point cloud image 525 (which may correspond to the complete dense point cloud 420). The stitched and corrected point cloud image 525 may comprise a complete depth map or point cloud with a wider range and FOV of the 3D environment around the receiver vehicle 512 as compared to the sparse point cloud 510 and the image 514 individually. This stitched and corrected point cloud image 520 can be used for different autonomous vehicle tasks, such as 3D object detection, perception, localization, and HD mapping.

Figure 6:
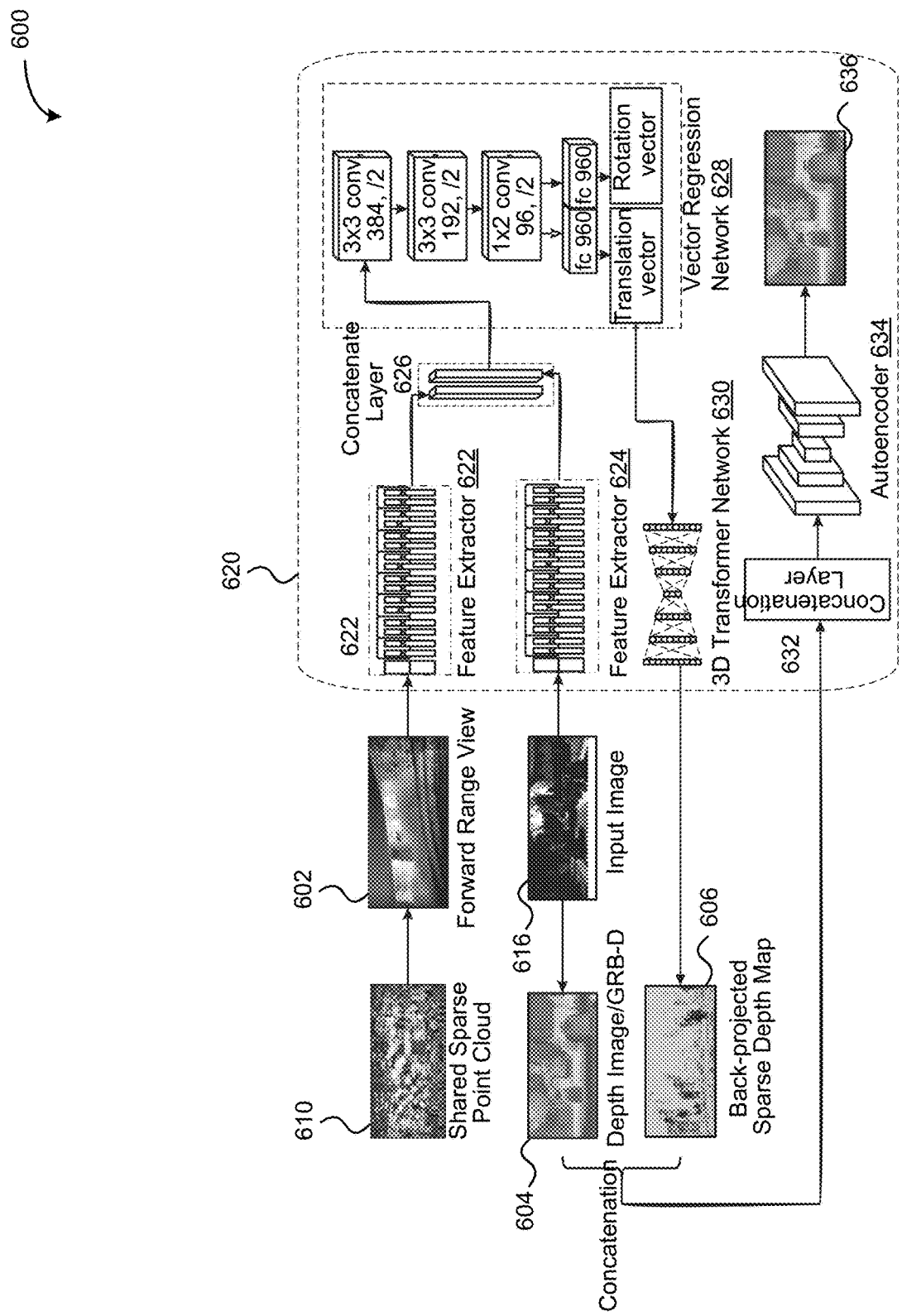
FIG. 6 depicts a flow diagram detailing the data processing by an example end-to-end cooperative depth completion pipeline in accordance with various embodiments.

FIG. 6 depicts a flow diagram 600 detailing data processing by an example end-to-end cooperative depth completion pipeline in accordance with various embodiments. In maintaining consistency of the discussion introduced above, operations of the diagram 600 are performed by the receiver vehicle 512, though such operations can be shared with the transmitter vehicle 502 or with a cloud computing environment.

As discussed above, the transmitter vehicle 502 may provide the sparse point cloud 610, which corresponds to the sparse point cloud 510, to the receiver vehicle 512, which performs the processing for the flow diagram 600 as shown. Alternatively, the transmitter vehicle 502 may generate the shared sparse point cloud 610 and further generate a forward range view 602 for sharing with the receiver vehicle 512 (not shown in FIG. 6). Additionally, the transmitter vehicle 502 may further process the forward range view 602 with a feature extractor (for example, similar to a feature extractor 622 discussed below) and share an extracted feature vector with the receiver vehicle 512 instead of sharing the sparse point clout 610 or the forward range view 602. Thus, the transmitter vehicle 502 may share one or more of the sparse point cloud 610, the forward range view 602, or the feature vector generated by the feature extractor 622 with the receiver vehicle 512. The discussion below assumes that the transmitter vehicle 502 shares the sparse point cloud 610 with the receiver vehicle 512 and that the receiver vehicle 512 performs the subsequent processing of the sparse point cloud 610.

The receiver vehicle 512 may process the shared sparse point cloud 610 to generate a forward range view 602. Specifically, an image processing module, such as the image processing circuit 210 of FIG. 2, may convert the received sparse point cloud 610 to the forward range view image 602 (for example, corresponding to a view captured by the sensor in a forward direction with respect to the transmitter vehicle 502), which has accurate depth information. Additionally, as described above, the receiver vehicle 512 may generate the raw image 616 using a camera sensor. The receiver vehicle 512 may process both the forward range view image 602 and the image 616 with the end-to-end cooperative depth completion pipeline 620. In some embodiments, a deep neural network of the end-to-end cooperative depth completion pipeline 620 can learn how to optimally combine the received sparse point cloud 510 with the image 516 to obtain the final combined 3D info for perception, etc. Specifically, the image processing module may process the forward range view image 602 and the image 612 with one or more feature extractors 622 and 624, respectively. In some embodiments, the feature extractors 622 and 624 correspond to convolutional neural network (CNN) based feature extractors or learning networks. The feature extractors 622 and 624 may process the forward range view image 602 and the image 612, respectively, to identify respective features of the images that can be used to simplify and/or improve processing of the images 602 and 616 by the end-to-end cooperative depth completion pipeline 620. For example, the feature extractor 622 may extract feature vectors that represent aspects of the forward range view image 602 and make the processing thereof more efficient while the feature extractor 624 extracts feature vectors that represent aspects of the image 616 and make processing of the image 616 more efficient. In some embodiments, the extracted feature vectors are learned feature vectors. The extracted feature vectors from the feature extractor 622 and 624 may be concatenated or combined via a concatenate layer 626 to generate a concatenated vector. The concatenated vector may be an input to a vector regression network 628. The vector regression network 628 may comprise a regression network (for example, using Gradient descent methodologies) that takes the input concatenated vector generated by the concatenate layer 626 and identifies rotation and translation vectors for a relative pose. Specifically, the vector regression network 628 may regress or output the relative pose between the LiDAR sensor that generated the sparse point cloud 610 and the camera sensor that generated the image 616, where the relative pose is output as the rotation and translation vectors. In some embodiments, the vector regression network 628 is a machine learning network that is trained to identify the relative pose between two inputs, such as the forward range view 602 and the input image 616.

Based on the rotation and translation vectors, a 3D transformer network 630 may backproject the sparse point cloud 610 into an image space of the input image 616 and generate a backprojected sparse depth map 606. Backprojection is used to convert data from the sparse point cloud 610 into the image space of the input image 616 based on spreading the data from the sparse point cloud 610 back into the input image 616. The 3D transformer network 630 may use the rotation and translation vectors representative of the relative pose between the sensors that generated the sparse point cloud 610 and the image 616 to properly align the sparse point cloud 610 and the image 616 when creating the backprojected sparse depth map 606. Specifically, the relative pose may direct the 3D transformer network 630 on how to manipulate one or both of the sparse point cloud 610 and the image 616 to obtain the proper alignment therebetween. Only once the sparse point cloud 610 and the image 616 are aligned can data from the two be combined to improve upon the corresponding individual data sets.

Once the 3D transformer network 630 generates the backprojected sparse depth map 606, a concatenation layer 632 and an autoencoder/decoder 634 may concatenate or stitch the backprojected sparse depth map 606 with a depth map (or depth image) 604 of the input image 616 to generate a concatenated image. More specifically, the concatenation layer 632 and the autoencoder/decoder 634 may automatically stitch the backprojected sparse depth map 606 together with the depth map 604 such that corresponding portions of the depth maps 604, 606 that overlap are aligned. The autoencoder/decoder 634 may employ a fully convolutional network or U-Net architecture to generate a corrected accurate depth map 636. Thus, the autoencoder/decoder 634 may learn, for example, based on the overlapping portions of the depth maps 604, 606, how to optimally stitch or combine the backprojected sparse depth map 606 and the depth map 604. In some embodiments, the autoencoder/decoder 634 may be replaced with one or more other types of deep neural networks to perform the corresponding processing to combine the respective depth maps 604, 606.

In some embodiments, the end-to-end cooperative depth completion pipeline 620 can be trained in an end-to-end manner based on one or more of photometric losses, chamfer distances, temporal consistency losses, and the like. The photometric losses may correspond to a dense pixel-wise error between a predicted depth map output by the and the corrected depth map 636. In some embodiments, the chamfer distances are a sum of squared distances of the nearest points between two point clouds (for example, the shared sparse point cloud 610 and the predicted depth map), and the temporal consistency loss is an accumulated temporal error between predicted and ground truth relative poses.

In some embodiments, the end-to-end cooperative depth completion pipeline can be trained to use input of raw images 616 and the sparse point cloud 610 to train the pipeline such that inputs of the sparse point cloud 610 (or the forward range view 602) and the image 616 to generate an output corrected depth map 636 for use with autonomous systems, such as perception, localization, mapping, and so forth.

In some embodiments, whether the transmitter vehicle 502 or the receiver vehicle 512 performs certain processing (such as generating the forward range view 602 from the sparse point cloud 610 or extracting feature vectors from the forward range view 602) is determined based on which vehicle has capabilities and bandwidth for the corresponding processing. For example, where the transmitter vehicle 502 is more resource constrained, the receiver vehicle 512 may perform more processing (e.g., generate the forward range view 602 and subsequent processing from the sparse point cloud received from the transmitter vehicle 502). On the other hand, where the receiver vehicle 512 is more resource constrained, the transmitter vehicle 502 may perform more processing (e.g., generate the forward range view 602 and extract the feature vector from the forward range view 602) and share the extracted feature vector with the receiver vehicle 512 to reduce computations required by the receiver vehicle 512.

In some embodiments, the end-to-end cooperative depth completion pipeline described herein can be trained to work in various embodiments irrespective of relative poses between the transmitter and receiver vehicles 502, 512 and corresponding sensors 504, 514, and so forth. Furthermore, the corrected depth maps 636 generated by the end-to-end cooperative depth completion pipeline may be shared with other vehicles traveling through the same environment.

In some embodiments, the transmitter and receiver vehicles 502, 512 may share the sparse point cloud 610 and the image 616 and/or corresponding corrected point cloud image 525 with a centralized server (not shown). Such sharing may enable the centralized server to continuously accumulate data that can be used to retrain the models continuously or periodically (for example, one or more of the feature extractors 622, 624, the vector regression network 628, the 3D transformer network 632, or the autoencoder/decoder 634).

In some embodiments, the transmitter and/or receiver vehicles 502, 512 share this data with the centralized server dynamically while the vehicles 502, 512 are traveling or when the vehicles 502, 512 are parked in an area having, for example, Wi-Fi coverage. In some embodiments, the receive vehicle 512 may share the processed data with the centralized server and use this data to retrain the model. In some embodiments, the retrained or updated models on the centralized server can be downloaded by the transmitter and receiver vehicles 502, 512 for use such that the vehicles 502, 512 utilize the most up-to-date models for the processing described above.

In some embodiments, the LiDAR sensor can be replaced with any other sensor that generates a highly accurate but sparse point cloud for sensed data and the camera sensor can be replaced with any other sensor that generates highly dense, less accurate data for sensed data. The fusion described by the end-to-end cooperative depth completion pipeline herein may employ variations of sensors than those described herein that maintain the benefits of the accuracy of the point clouds fused with the density of images. Thus, the difference of modalities makes the fusion described herein work.

Figure 7:
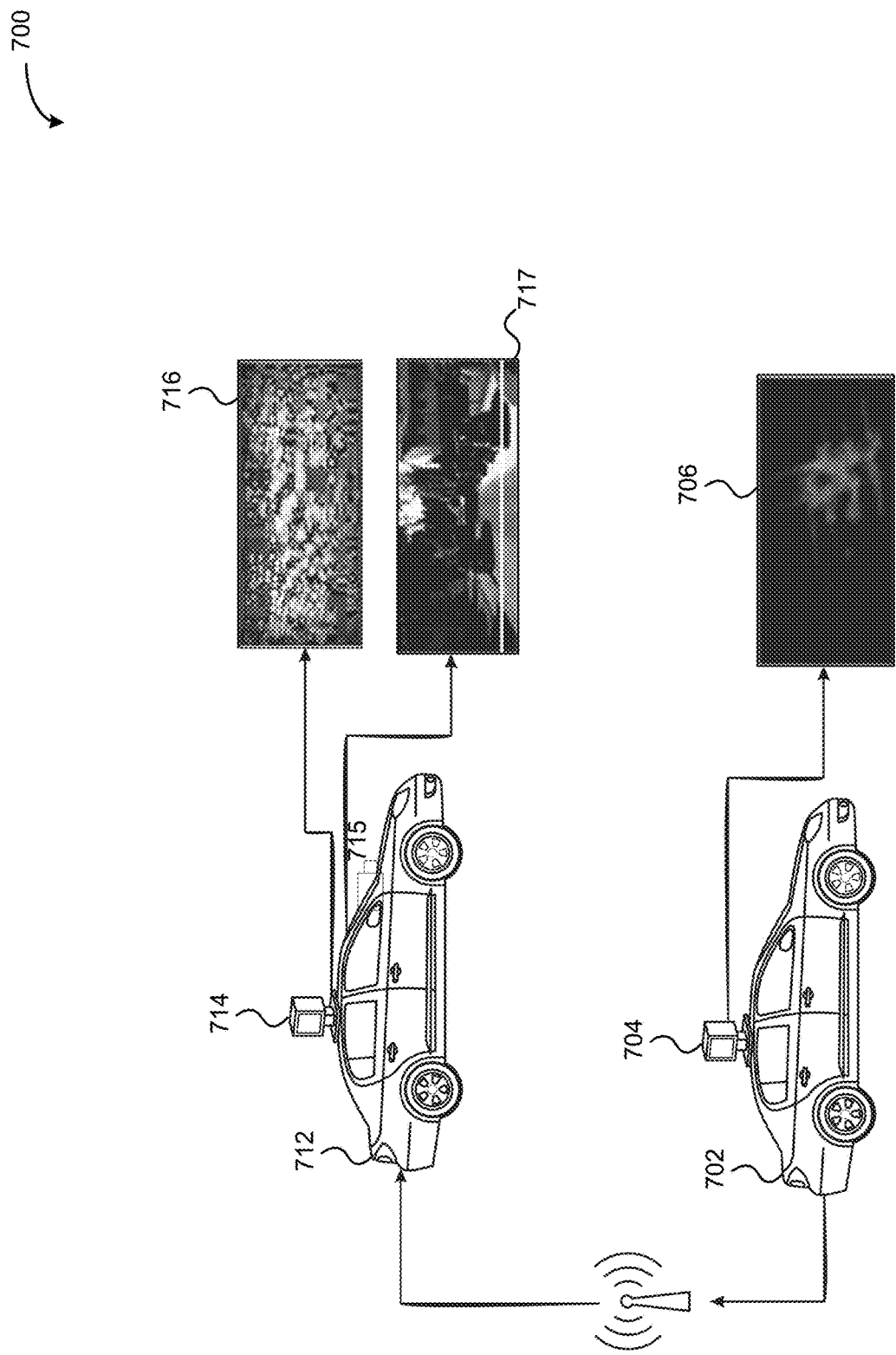
FIG. 7 depicts a flow diagram of an example system configured to collect training data used to train the end-to-end cooperative depth completion pipeline in accordance with various embodiments.

FIG. 7 depicts a high-level flow diagram 700 of an example system configured to collect training data used to train the end-to-end cooperative depth completion pipeline in accordance with various embodiments.

Specifically, the diagram 700 shows that a transmitter vehicle 702 (corresponding to the transmitter vehicle 602) having a LiDAR sensor 704 that generates a point cloud 706 that is wirelessly shared with a receiving vehicle 712. As described above, the wireless sharing can be performed by any means of wireless communication. The shared point cloud 706 may correspond to a full point cloud as captured by the LiDAR sensor 704, such as the point cloud 506, or a partial or sparse point cloud, such as the sparse point cloud 510.

A receiver vehicle 712 (corresponding to the receiver vehicle 612) comprises a LiDAR sensor 714 and a camera sensor 715. The LiDAR sensor 714 may generate a local point cloud from which the receiver vehicle 712 generates ground truth depth data 716, while the camera 715 generates a raw image 717, corresponding to the image 516. In some embodiments, the receiver vehicle 712 may use the ground truth depth data as a target for training how the received point cloud 706 is fused with the image 717. For example, the receiver vehicle 712 can try different methods of fusing the received point cloud 706 with the image 716 to obtain a resulting depth map that is similar to the ground truth depth map generated from the LiDAR sensor 714. Thus, the ground truth depth map can be used to train the end-to-end cooperative depth completion pipeline described herein.

Figure 8:
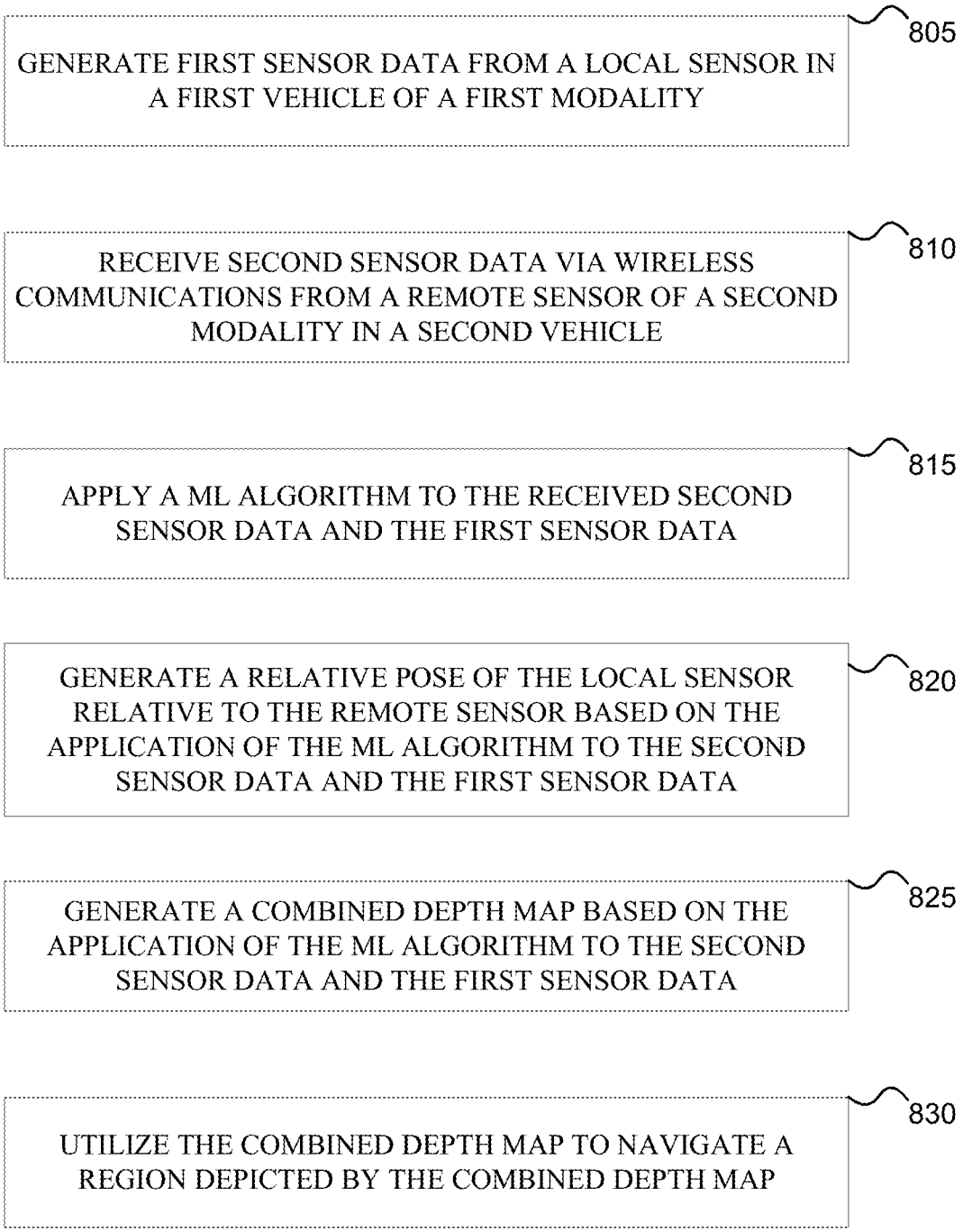
FIG. 8 depicts a high-level flow diagram of a system configured to collect training data used to train an example end-to-end cooperative depth completion pipeline in accordance with various embodiments.

FIG. 8 shows example steps that can be performed by an image processing circuit 210 (or an external controller) of a transmitting or receiving vehicle that performs the processing described herein when executing one or more operations in performance of method 800 in accordance with various embodiments. For example, the processor 206 can fetch, decode, and/or execute one or more instructions for performing various steps of the method 800. Various instructions (e.g., for performing one or more steps described herein) can be stored in non-transitory storage medium of the memory 208 and/or corresponding control logic circuitry, where the term "non-transitory" does not encompass transitory propagating signals. "Non-transitory" as used herein refers to any media that store data and/or instructions that cause a machine to operate in a specific fashion. Such non-transitory media may comprise non-volatile media and/or volatile media. Non-volatile media includes, for example, optical or magnetic disks. Volatile media includes dynamic memory. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same. As described in detail below, machine-readable storage medium of the memory 208 may be encoded with executable instructions, for example, instructions for executing steps of the method 800. Non-transitory media is distinct from but may be used in conjunction with transmission media. Transmission media participates in transferring information between non-transitory media. For example, transmission media includes coaxial cables, copper wire and fiber optics, including the wires that comprise bus between the processor 206 and the memory 208. Transmission media can also take the form of acoustic or light waves, such as those generated during radio-wave and infra-red data communications.

The method 800 may comprise a method of handling sensor data from a number of sensors of different modalities disposed on different vehicles to generate a fused depth map. Operations that make up the method 800 may be performed by one or more vehicles, such as the transmitting vehicle 702 or the receiving vehicle 712 of FIG. 7. For example, the operations of the method 800 are described as being performed by the receiving vehicle 712. Furthermore, the operations of the method 800 would likely be performed by the image processing circuit 210, regardless of the combination of the transmitting vehicle 702 or the receiving vehicle 712 that performs the operations, or in a cloud-based computing environment.

A step 805 of the method 800 comprises the receiving vehicle generating a first sensor data from a local sensor having a first modality. In some embodiments, where the method 800 is performed by the receiving vehicle 712, the local sensor having the first modality comprises a camera sensor disposed at the receiving vehicle. In some embodiments, the receiving vehicle may comprise the LiDAR sensor.

At step 810, the receiving vehicle may receive a second sensor data via wireless communications from a remote sensor of a second modality disposed at a second vehicle. Where the local sensor is the camera sensor, the remote sensor of the second modality may comprise a LiDAR or similar point cloud generating sensor. Where the local sensor is the LiDAR sensor, the remote sensor may comprise a camera or similar imaging sensor.

At step 815, the receiving vehicle may apply a machine learning (ML) algorithm to the first sensor data and the second sensor data. In some embodiments, the ML algorithm may comprise the processing introduced above with respect to the end-to-end cooperative depth completion pipeline 620. In some embodiments, the processor 206 and the memory 208 of the image processing circuit 210 may comprise hardware and instructions that facilitate employing a ML algorithm and other deep learning or similar processing. image processing circuit 210 may comprise a machine learning. In some embodiments, applying the ML algorithm may comprise one or more of applying one or more feature extractors (e.g., feature extractors 622, 624) to the first and/or second sensor data, applying a vector regression network (e.g., vector regression network 628) to concatenated layers from the feature extractors, using a 3D transformer network (e.g., the 3D transformer network 630) to generate a backprojected sparse depth map (e.g., the backprojected sparse depth map 606), or employing a concatenation layer and autoencoder to generate a corrected accurate depth map (e.g., the corrected accurate depth map 636).

At step 820, the receiving vehicle may generate a relative pose of the local sensor relative to the remote sensor based on the application of the ML algorithm to the first sensor data and the second sensor data. As introduced above, this may comprise applying the vector regression network 628 to the features extracted and concatenated from a forward view image generated from the received second sensor data and the image generated from the first sensor data.

At step 825, the receiving vehicle may generate a combined depth map based on the application of the ML algorithm to the first sensor data and the second sensor data. In some embodiments, this combined depth map corresponds to one or more of the backprojected sparse depth map 606 or the corrected accurate depth map 636.

At step 830, the receiving vehicle may utilize the combined depth map to navigate a region depicted by the combined depth map. For example, when the combined depth map generated at step 825 comprises the corrected accurate depth map 636, the receiving vehicle may use the combined depth map to perform various operations, such as perception, localization, and mapping of objects, etc., in the environment of the receiving vehicle.

In some embodiments, while the method 800 is described as being performed by the receiving vehicle, it will be understood that the corresponding operations are performed by the image processing circuit 210 or similar processing components disposed in the receiving vehicle. Furthermore, in some embodiments, the operations of the method 800 are performed in a cloud-based computing system where there are no local sensors and both sensors are remote from the components performing the processing. As such, the cloud-based or centralized processing system may receive sensor data from multiple vehicles and perform the processing associated with FIG. 6 above to implement the ML algorithms of the end-to-end cooperative depth completion pipeline 620 to generate, for example, one or more of the backprojected sparse depth map 606 or the corrected accurate depth map 636. In some embodiments, the one or more generated depth maps are communicated back to one or more of the multiple vehicles to enable one or more of the multiple vehicles to perform various operations, such as perception, localization, and mapping of objects, etc., in the environment.

It should be understood that the various features, aspects, and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method, comprising:
    generating first sensor data from a local sensor in a first vehicle of a first modality;
    receiving second sensor data from a remote sensor of a second modality in a second vehicle;
    applying a ML algorithm to the second sensor data and the first sensor data;
    generating, based on application of the ML algorithm to the second sensor data and the first sensor data:
        a relative pose of the remote sensor relative to the local sensor, with the relative pose being a position and orientation of the remote sensor relative to a location of the local sensor, and the position and the orientation of the remote sensor being distinct from a second position and second orientation of the second vehicle; and
        a combined depth map based on the second sensor data, the first sensor data, and the relative pose; and
    utilizing the combined depth map to navigate an environment depicted by the combined depth map.

2. The method of claim 1, wherein one of the local sensor of a first modality and the remote sensor of a second modality comprises one or more of a RADAR sensor or a LiDAR sensor and the other of the local sensor of a first modality and the remote sensor of a second modality comprises an RGB camera sensor.

3. The method of claim 1, wherein the second sensor data is received from the remote sensor of the second modality in the second vehicle via a wireless communication using a local radio circuit.

4. The method of claim 1, wherein the first sensor data comprises a raw image captured by a camera modality local sensor and the second sensor data comprises a point cloud captured by a LiDAR modality remote sensor.

5. The method of claim 1, wherein the applying the ML algorithm to the second sensor data and the first sensor comprises:
    extracting a first feature vector based on the first sensor data using a first feature extractor;
    extracting a second feature vector based on the second sensor data using a second feature extractor; and
    concatenating the first feature vector with the second feature vector.

6. The method of claim 5, wherein the generating the relative pose comprises generating a translation vector and a rotation vector corresponding to the relative pose of the remote sensor relative to the local sensor via a regression network based on the first feature vector and the second feature vector.

7. The method of claim 6, wherein the first sensor data comprises a raw image captured by a camera modality local sensor and the second sensor data comprises a point cloud captured by a LiDAR modality remote sensor; and
    wherein generating the combined depth map comprises:
        generating a backprojected sparse depth map based on overlapping corresponding regions of the point cloud and the image according to the translation vector and the rotation vector of the relative pose between the local sensor and the remote sensor; and
        combining the backprojected sparse depth map and a depth map generated based on the raw image using an autoencoder to generate the combined depth map.

8. A system, comprising:
a local sensor of a first modality configured to generate first sensor data;
a receiver circuit configured to receive second sensor data from a remote sensor of a second modality;
a processor; and
a memory configured to store instructions that, when executed by the processor, cause the processor to:
apply a ML algorithm to the received second sensor data and the first sensor data;
generate a relative pose of the local sensor relative to the remote sensor based on application of the ML algorithm by generating a translation vector and a rotation vector corresponding to the relative pose of the local sensor relative to the remote sensor via a regression network based on a first feature vector and a second feature vector;
generate a combined depth map based on the second sensor data, the first sensor data, and the relative pose; and
utilize the combined depth map to navigate a region depicted by the combined depth map.

9. The system of claim 8, wherein one of the local sensor of a first modality and the remote sensor of a second modality comprises one or more of a RADAR sensor or a LiDAR sensor and the other of the local sensor of a first modality and the remote sensor of a second modality comprises an RGB camera sensor.

10. The system of claim 8, wherein the first sensor data comprises a raw image captured by a camera modality local sensor and the second sensor data comprises a point cloud captured by a LiDAR modality remote sensor.

11. The system of claim 8, wherein application of the ML algorithm to the second sensor data and the first sensor comprises further instructions that, when executed by the processor, further cause the processor to:
extract the first feature vector based on the first sensor data using a first feature extractor;
extract the second feature vector based on the second sensor data using a second feature extractor; and
concatenate the first feature vector with the second feature vector.

12. The system of claim 8, wherein the first sensor data comprises a raw image captured by a camera modality local sensor and the second sensor data comprises a point cloud captured by a LiDAR modality remote sensor; and
wherein the instructions that cause the processor to generate the combined depth map comprise instructions that cause the processor to:
generate a backprojected sparse depth map based on overlapping corresponding regions of the point cloud and the image according to the translation vector and the rotation vector of the relative pose between the local sensor and the remote sensor; and
combine the backprojected sparse depth map and a depth map generated based on the raw image using an autoencoder to generate the combined depth map.

13. A cloud-based system comprising:
a receiver circuit configured to receive:
first sensor data from a first sensor of a first modality at a first vehicle; and
second sensor data from a second sensor of a second modality at a second vehicle;
a processor;
a memory configured to store instructions that, when executed by the processor, cause the processor to:
apply a ML algorithm to the first sensor data and the second sensor data;
generate a relative pose of the first sensor relative to the second sensor based on application of the ML algorithm, with the relative pose being a position and orientation of the first sensor relative to a location of the second sensor, the relative pose of the first sensor being distinct from a second relative pose of the first vehicle and the location of the second sensor being distinct from a second location of the second vehicle; and
generate a combined depth map based on the first sensor data, the second sensor data, and the relative pose; and
a transmitter circuit configured to transmit the combined depth map to at least one of the first vehicle or the second vehicle to enable the at least one of the first vehicle or the second vehicle to navigate an environment depicted by the combined depth map.

14. The system of claim 13, wherein one of the first sensor of a first modality and the second sensor of a second modality comprises one or more of a RADAR sensor or a LiDAR sensor and the other of the first sensor of a first modality and the second sensor of a second modality comprises an RGB camera sensor.

15. The system of claim 13, wherein the first sensor data comprises a raw image captured by a camera modality first sensor and the second sensor data comprises a point cloud captured by a LiDAR modality second sensor.

16. The system of claim 13, wherein application of the ML algorithm to the second sensor data and the first sensor data comprises further instructions that, when executed by the processor, further cause the processor to:
extract a first feature vector based on the first sensor data using a first feature extractor;
extract a second feature vector based on the second sensor data using a second feature extractor; and
concatenate the first feature vector with the second feature vector.

17. The system of claim 16, wherein the instructions that cause the processor to generate the relative pose comprise instructions that cause the processor to generate a translation vector and a rotation vector corresponding to the relative pose of the first sensor relative to the second sensor via a regression network based on concatenation of the first feature vector with the second feature vector.

18. The system of claim 17, wherein the first sensor data comprises a raw image captured by a camera modality first sensor and the second sensor data comprises a point cloud captured by a LiDAR modality second sensor; and
wherein the instructions that cause the processor to generate the combined depth map comprise instructions that cause the processor to:
generate a backprojected sparse depth map based on overlapping corresponding regions of the point cloud and the image according to the translation vector and the rotation vector of the relative pose between the first sensor and the second sensor; and
combine the backprojected sparse depth map and a depth map generated based on the raw image using an autoencoder to generate the combined depth map.

19. The system of claim 8, wherein the local sensor is located in a first vehicle and the remote sensor is located in a second vehicle.

20. The system of claim 8, wherein the relative pose is a position and orientation of the local sensor relative to a location of the remote sensor, with the position and the orientation of the local sensor being distinct from a second position and second orientation of the first vehicle.

* * * * *